(No Model.)
T. J. RUNDEL.
COFFEE ROASTER.
No. 339,114. Patented Mar. 30, 1886.
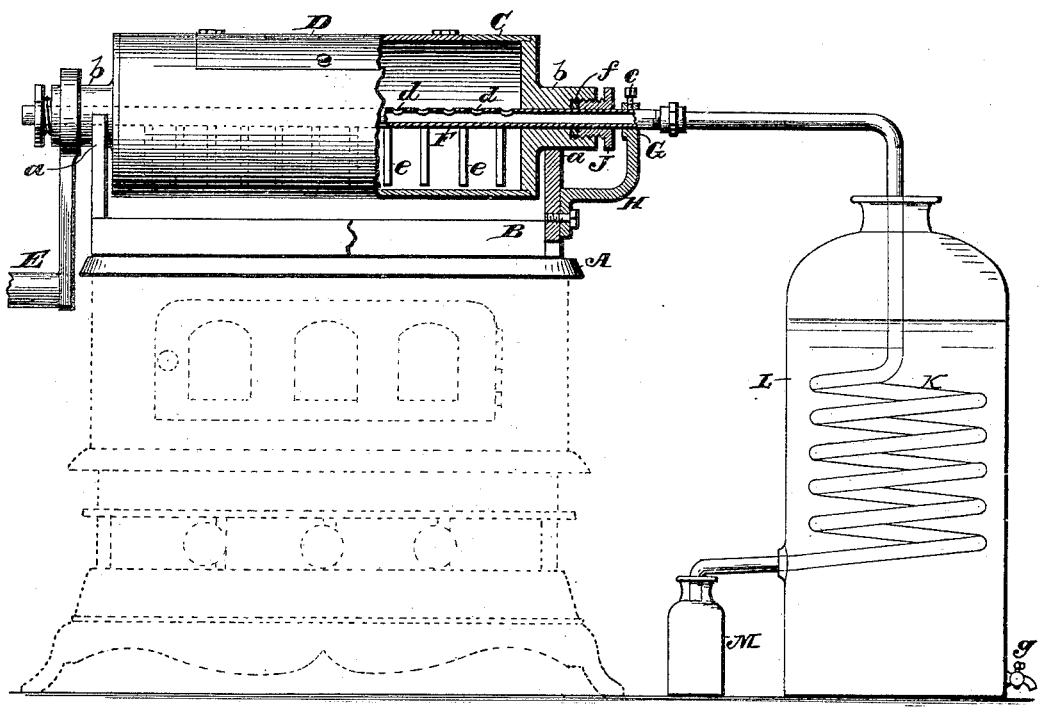
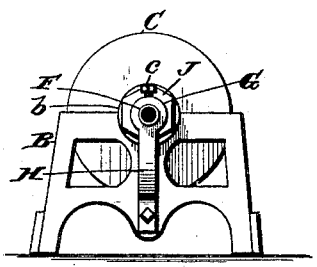
Witnesses.
Robert Everett,
Percy B. Hills.
Inventor.
Thomas J. Rundel.
By James L. Norris.
Atty.

UNITED STATES PATENT OFFICE.

THOMAS J. RUNDEL, OF BROOKLYN, NEW YORK.

COFFEE-ROASTER.

SPECIFICATION forming part of Letters Patent No. 339,114, dated March 30, 1886.

Application filed February 18, 1886. Serial No. 192,421. (No model.)

*To all whom it may concern:*

Be it known that I, THOMAS J. RUNDEL, a citizen of the United States, residing at Brooklyn, in the county of Kings and State of New York, have invented new and useful Improvements in Apparatus for Collecting the Volatile Products of Roasted Substances, of which the following is a specification.

My invention relates to improvements in the apparatus for collecting and utilizing the vapors and essences which are given off from various substances—such as coffee-beans, cocoa, almonds, beef, and other vegetable and animal materials while being roasted.

The object of my invention is to effect an economical saving and utilization of the volatile products resulting from the process of roasting meats, coffee, and other substances, and to improve the flavor and aroma of such roasted materials by adding to or incorporating with them the volatile and aromatic essences thrown off in roasting, which volatile essences are almost entirely lost by the ordinary open and exposed method of roasting.

My invention consists in that improvement in the apparatus for culinary roasting by which the articles to be roasted are confined in a closed rotary cylinder, exposed to heat and inclosing a stationary perforated pipe provided with stirrer-arms, said pipe being connected at one end with the worm of a condenser, through which the aromatic and volatile products of the roasted substance are collected.

The invention also consists in certain peculiarities in the construction and combination of the parts of the apparatus, as will be hereinafter set forth.

In the annexed drawings, illustrating the invention, Figure 1 is a sectional side elevation of an apparatus embodying my invention. Fig. 2 is an end elevation of the same.

Referring to these drawings, the letter A designates the upper portion of a stove. B is a frame, which is supported on the stove and provided at each end with a box or bearing, $a$, for a tubular projection or journal, $b$, on each head of a rotary cylinder, C, which is thus supported in the frame and above the top of the stove. The cylinder C is provided with a door, D, for affording access to the interior, and a handle or crank, E, may be attached to one of the tubular journals $b$ for the purpose of providing a means of rotating the cylinder. If desired, the cylinder may, however, be rotated by power of any suitable kind applied in any convenient manner.

Through the cylinder C and its tubular journals $b\ b$ is passed a pipe, F, which is supported at one end in a collar, G, formed on a bracket, H, that is detachably secured to one end of the supporting-frame of the cylinder. This collar G is perforated for the passage of a set-screw, $c$, by which the pipe F is held stationary while the cylinder rotates around it.

Within the cylinder C the pipe F is provided with a series of perforations, $d\ d$, for the exit of vapors and volatilizable substances from the cylinder. The pipe F may be also provided in the interior of the cylinder with a number of stirrer-arms or agitators, $e\ e$, which are preferably arranged to project downward, so as to be always in the midst of the material being roasted. In roasting meat and like substance, however, these arms $e$ will be omitted, as they are required when roasting coffee and the like.

In order to prevent the escape of vapors from the cylinder, except through the pipe F, the door D will be made close-fitting, and each of the cylinder-journals $b$ will have a steam-tight packing. This packing may consist of a washer, $f$, set into the cored outer end of such journal $b$, surrounding the pipe F, and held in place by an annular flanged cap, nut, or stuffing-box, J, thus preventing any leakage of steam or volatile matter. The stationary pipe, F, is closed at that end of the cylinder to which power is applied, and at this closed end it need project only slightly beyond the stuffing-box. The opposite or open end of the pipe F is in communication with the worm or coil K, and joined thereto by means of a double-nut connecting-coupling, whereby the coil may be of less size than the pipe F of a condensing-vessel, L, that contains cold water, the supply of which may be replenished from time to time by any suitable means, as required.

If desired, the vessel L may be provided with a cock, $g$, for drawing off its contents.

The condensing worm or coil K has its exit through the lower part of the vessel L, and delivers the condensed liquid to a receiving-vessel, M, of any convenient form.

It will be seen that the volatile matters escaping through the pipe F are caused to enter the condenser at the top and find an exit at the bottom, thus affording a constant downward condensation.

By the employment of this simple apparatus in the operation of roasting coffee, meats, and other substances it is possible to gather and save the volatile essences that are usually lost in the ordinary exposed methods of roasting; and the valuable products thus obtained can be readily and economically utilized by subsequently adding them to the roasted article, thereby enhancing its nutritive qualities, or they may be otherwise utilized in any desirable manner. The substances to be treated in this manner are placed in the cylinder C, above a suitable fire, and during the operation of roasting, the cylinder is rotated so as to secure a uniform distribution of heat.

If coffee or other similar material is under treatment, the stationary pipe F will be provided with the stirrer-arms e, as before explained. These stirrers serve to agitate and intermix a granular substance, and thus expose it thoroughly and uniformly to the action of the heat. The vapors and volatile matters thrown off from the roasting substance find their way through the perforations e e into the pipe F, and are thereby conducted to the condensing worm or coil K, whence they escape to the receiver M in a liquid form. This liquid contains the aroma and the valuable essences that might otherwise be lost, and forms a fluid extract of the substance under treatment. The first running from the coil K is usually strong and of a dark color, the liquid becoming gradually weaker as the flow continues. When it is desired to save the strong and rich portion of the liquid by itself for any required purpose, the flow may be arrested at a suitable moment or the receiving-vessel can be changed. The weaker portions of liquid subsequently collected can be set aside until a sufficient quantity is obtained, which may be put into the cylinder for the purpose of moistening its contents in a subsequent roast. In the case of coffee the volatile products of the roasting operation when thus collected in a liquid form may be employed in making a coating for the roasted coffee, which will thus be improved in strength and aroma, and as an extract used in the preparation of sirups with soda-water, &c.

What I claim as my invention is—

1. In a roasting apparatus, the combination of a rotary cylinder having tubular journals b b, cored at their ends, a stationary perforated pipe passed through the tubular journals and having stirrers depending therefrom, the washers or packings f f, stuffing-boxes J J, and a condenser having its coil in communication with the perforated pipe, substantially as described.

2. In a roasting apparatus, the combination of the rotary cylinder C, having tubular journals b b, the supporting-frame B, the stationary pipe F, passing through said cylinder and having perforations d, the stirrers e, depending from said pipe, the condenser L, having coil K, and the receiving-vessel M, substantially as described.

In testimony whereof I affix my signature in presence of two witnesses.

THOMAS J. RUNDEL.

Witnesses:
HENRY E. RITCHIE,
JACOB G. CARPENTER.